US008021156B2

(12) United States Patent
Sweeney (10) Patent No.: US 8,021,156 B2
(45) Date of Patent: Sep. 20, 2011

(54) METHOD AND SYSTEM FOR ARRANGING AND DISPLAYING PROJECT MANAGEMENT INTELLIGENCE

(76) Inventor: Kenneth J. Sweeney, Friendswood, TX (US)

( * ) Notice: Subject to any disclaimer, the term of this patent is extended or adjusted under 35 U.S.C. 154(b) by 603 days.

(21) Appl. No.: 12/105,200

(22) Filed: Apr. 17, 2008

(65) Prior Publication Data

US 2009/0263769 A1    Oct. 22, 2009

(51) Int. Cl.
*G09B 19/18* (2006.01)
(52) U.S. Cl. ........................................ 434/107
(58) Field of Classification Search .................. 434/107, 434/129, 168, 236, 237; 705/10, 11
See application file for complete search history.

(56) References Cited

U.S. PATENT DOCUMENTS

| | | | |
|---|---|---|---|
| 6,626,677 B2* | 9/2003 | Morse et al. | 434/237 |
| 7,083,417 B1* | 8/2006 | Liu et al. | 434/236 |
| 2002/0103774 A1* | 8/2002 | Victor et al. | 706/11 |
| 2007/0122779 A1* | 5/2007 | Siler | 434/219 |
| 2008/0187899 A1* | 8/2008 | Cabrera | 434/403 |
| 2008/0193907 A1* | 8/2008 | Pauwels | 434/322 |

\* cited by examiner

*Primary Examiner* — Kurt Fernstrom
(74) *Attorney, Agent, or Firm* — Kenneth A. Roddy (57) ABSTRACT

A method and system for arranging, displaying, conveying, learning, and communicating project management intelligence utilizes a device formed of a plurality of 3-dimensional geometric polytopes movably connected together and movable relative to one another. The polytopes represent the domain of project knowledge, the domain of project process groups, and the domain of project management competency, respectively and each polytope has surfaces or sections bearing indicia representing clusters of functional information and aspects of project management relative to the respective project management intelligence domain. The polytopes are manipulated individually to align selected surfaces or sections of each polytope relative to one another so as to collectively visually display selected combinations of interrelated and conjoined functional information and aspects of project management intelligence within the domains.

12 Claims, 4 Drawing Sheets

METHOD AND SYSTEM FOR ARRANGING AND DISPLAYING PROJECT MANAGEMENT INTELLIGENCE

FIELD OF THE INVENTION

This invention relates generally to systems for displaying and communicating various aspects of project management and, more particularly, to a method and system utilizing articulating 3-dimensional objects for visually displaying characteristic intelligence within the project management field, domains of the field, clusters of areas of the domains, area functions, and interrelated elements and aspects for improving effectiveness of target project stakeholders and project management results.

BACKGROUND ART

"Projects" are defined as temporary endeavors undertaken to create a unique product, service or result, in contrast to "operations" which are ongoing. Competent project management is generally recognized as essential to the success of project outcomes and the project's ultimate results. Frequently; however, project management aptitude is not commensurate with the spatially integrated and highly interrelated nature of project management. Sixteen million individuals in the United States assert working annually in project management. Nearly $10 Trillion of global GDP ($40 Trillion) is spent annually on projects. In the US, $2.7 Trillion of U.S. GDP ($11 Trillion) is annually spent on projects. The Chaos Report 2004 (Standish Group International, Inc. West Yarmouth, Mass.) notes that among 13,522 information technology projects, only 34% of projects are successful, 15% fail, and 51% are challenged (challenged refers to projects being completed but incurring cost and or schedule overruns and or diminished quality and or scope reduction from planned). Of the challenged projects only 46% incurred cost overruns under 20% of budget, and 54% incurred cost overruns over 20% of budget. The average cost overrun was 43% and this compared favorably with 180% average cost overrun in 1994. Dollar waste due to cost overruns was $55 Billion in 2002 against $255 Billion of project spending. Time overruns have increased significantly to 82% from a low of 63% in 2000. Scope reductions resulted in 52% of projects requiring features dropped in the final product release.

Project management intelligence and its spatially interrelated system activity requires continual acquisition and maintenance of knowledge, formal development of general management skills, and experiential training in project management practices. In an increasingly competitive marketplace, improving project management quality and effectiveness relates to ultimate profitability and even business survival. Formalized pedagogic training materials directed toward project management are produced and published by industry institutes and trade groups, such as: Project Management Institute (PMI)—publisher of an authoritative and comprehensive reference-Project Management Body of Knowledge (PMBOK), Computer Technology Industry Association (CompTIA); and numerous professional authored texts, including; *Project Management Professional Study Guide* by Kim Heldman, *IT Project Management On Track from Start to Finish* by Joseph Phillips, *Examguide IT Project+* by Kathy Schwalbe; and numerous others.

Commercial computer and networking software products directed to useful project management and its improvement are known in the art, such as: Microsoft Project, published by Microsoft Corporation; Pertmaster (Project Risk Software), published by Primavera Systems, Inc.; SMART, published by Process Integrity, Inc.; PLANVIEW, published by PlanView, Inc.; Project Portfolio Management, published by Welcom US/UK; Winsight—Earned Value Management, published by C/S Solutions, Inc.; and TRAKKER/iPursuit, published by Dekker, Ltd. Other numerous training formats are also known in the art, such as; Project Management Degree programs at universities, PMP chapter trainings, and individual service providers and coaches hosting workshops and pedagogic forums.

Microsoft Project (MSProject), is a specialized 2-dimensional computer software application screen formatted as a Gantt oriented charting tool used primarily for inputting, listing, displaying, tracking and viewing project tasks, time schedules, milestones, work activity status and reports of project work completed and to-be completed. MSProject is a stand-alone project task and cost software application tool that does not interact directly with vast amounts of additional project knowledge, processes and management competencies. MSProject is a narrow specific application tool in that it does not include techniques and methods to merge with other project wide intelligence aspects, such as, but not limited too; core and facilitating knowledge requirements, initiation and closure activities, and the vast areas of project managerial competencies; decision making, consensus building, team development, human resource management, leadership behaviors, negotiation nor hundreds of thousands of other project management techniques and methods.

Pertmaster (Project Risk Software), published by Primavera Systems, Inc. is another specialized 2-dimensional add-in software, that allows users to apply risk analysis to existing MSProject data and displaying risk results. Probabilistic risk and uncertainty can be added to the project schedule for building tasks and related cost risk registries and determine likelihoods of meeting project targets. However, as in MSProject, vast amounts of essential project knowledge, processes and management competencies are not taught with the software application.

A 2-dimensional computer software system, SMART, published by Process Integrity, Inc. is a measurement tool for acquiring, prompting, tracking, validating, and verifying and producing project quality reports. Again, vast quantities of other critical project intelligence knowledge and managerial competency functions and elements necessary for successful project management are absent and left unattended too.

PLANVIEW, published by PlanView, Inc. produces a IT Project Portfolio Management software with capability to; plan project resource assignments, staffing, work scheduling and status reporting, cost and financial forecasting, baselining, and managing project budgets, performance tracking, and change management. However, as in other dedicated 2-D computer software systems PLANVIEW is a necessary project management tool but does not sufficiently include other essential of project initiation and closure aspects and the vast critical areas of managerial competencies, such as but not restricted to; scope and quality definitions, team development, leadership behavior, communications skills, negotiation strategies, consensus convergence techniques, and enormous amounts of other areas of project management intelligence left outside the scope of this method.

Winsight—Earned Value Management, published by C/S Solutions, Inc. is used by US Air Force, Army, Navy, Department of Energy, Defense Contract Management Command, and the Defense Systems Management College to train selective project management concepts. Winsight is a 2-D particular computer based software tool aimed explicitly at financial performance aspects of earned value of project management.

Once again, vast areas of other project management intelligence tools knowledge and managerial competencies are not taught.

TRAKKER/iPursuit, published by Dekker, Ltd., is another narrowly focused 2-D earned value management and analysis software tool for merging project cost and schedule performance data, including optional modules providing for project cost, schedule and resource integration into MSProject to produce performance reports. Once more, vast areas of project management intelligence, project knowledge and managerial competency are not apparent implicitly or explicitly.

Kepner-Tregoe, a highly publicized professional management-training firm, provides project manager skill building and training. Kepner-Tregoe project training is particularly targeted to managerial competencies, such as; critical thinking, decision making, problem solving, getting work commitments from team members, art of communication, management styles, workplace motivation techniques, human performance management, and leadership behavior all essential but insufficiently merged with other essential project intelligence domains to present project management as a unified system. Training is conveyed by 1 and 2-dimensional computer displays, voice delivery, and paper media with content presented in a linear-like step-by-step sequence. The specialized project management content takes days to weeks to convey even the limited project management competency content.

U.S. Pat. Nos. 4,744,026, 4,885,686, and 4,924,386 disclose apparatus and methods specially designed for the efficient allocation of a plurality of resources utilizing the Karmarker algorithm (a linear programming variant) and polytopes in accordance with cost assignments. The narrow disclosures inform the use of polytopes to a limited resource situation involving resources that are commonly found in project management but do not embrace nor embody myriad of broad domains of project management knowledge, processes or managerial competencies either in particular or as a unified system.

U.S. Pat. No. 5,630,070 discloses methods for optimization of a plurality of resources or products of differing types with production constraints for manufacturing resource planning. The methods utilize mathematical linear programming optimization procedures within matrices to optimize resource usage times, carrying amounts, inventory quantities, subassemblies, costs, revenues and penalties, demand data, bill-of-resource data, resource availability data, resource constraining parameters, and other related variables. The disclosure relates the use of optimizing resources in constrained conditions that are frequently found in project management but does not claim an advantage linking optimization results with or merging results interactively into the domains of project management knowledge, processes or managerial competencies either in particular or as a unifying system.

U.S. Pat. No. 5,974,391, discloses a device and method for project management for generating a Gantt chart displaying a plurality of work steps, activity schedule bars, schedule start and end points and work-step-divisions. As in all cited prior art said disclosure teaches the specialized useful art of Gantt charting activity but does not present an advantage of conveying or displaying the domains of project management intelligence as a unified system.

U.S. Pat. No. 7,006,978 discloses a method and system for developing an acquisition integration project plan. The systems and methods teach the facilitated integration of one corporate entity into another corporate entity. In one embodiment, a method in a computer for generating an acquisition integration project plan includes displaying a plurality of pre-defined integration events based upon at least one user selected integration area, each pre-defined integration event being associated with a phase in an acquisition process. The systems and methods jointly employ the use of MSProject as previously described herein. Once again, said disclosure does not incorporate advantages of concurrently conveying, communicating, or teaching the unified system aspects of project management intelligence.

The Project Management Institute (PMI)—publisher of an authoritative and comprehensive standards and terms of reference—the Project Management Body of Knowledge (PMBOK) and the Computer Technology Industry Association (CompTIA) both standards promulgation and certification bodies provide a common point of reference to the vast body of project management field literature which is conveyed with 1 and 2-dimensional media. These referencing bodies and related publications disclose the domains of project management intelligence in detail by using large volumes of 1 and 2-dimensional written literature. However, these authoritative references present project management intelligence in a step-by-step, and sequential linear definitional format. Such materials lack 3-dimensional qualities and are conveyed mostly as definitional collections or groupings of defined terms that when added together comprise a project management. However, content is conveyed to learners in sequential event ordered fashion with little unifying focus on project management as a system. Moreover, these authoritative sources do not disclose devices, methods, techniques, and embodiments that can be utilized to display project management as a dynamic unified system.

These widely used but narrow and selective methods and tools directed toward the project management field aim to solve specialized local and important problems faced by project management. The relevant art is applied to in-depth and highly specialized aspects of a discrete problem of project management that in-turn yield solutions for a small but nevertheless important project area. In this narrow sense, prior art teachings are useful to solve selective and local problems in efforts to achieve more effective project management. However, the project management tools, training and learning material utilized in these prior methods are primarily conveyed by use of spatial 1 or 2-dimensional means and or word of mouth and may require a degree of computer and networking literacy, time away from project work to attend, and are usually costly.

The prior art computer software methods and devices have an advantage for rapid entering, accessing, shaping and conveying highly specialized areas of project management intelligence, but are limited in their ability to effectively and efficiently convey a unified, broad and comprehensive range of project management intelligence as a spatially conjoined and interrelated whole. Prior systems are designed as 1 and 2-dimensional materials providing a sequential manner and means by which highly spatially limited project management intelligence tools and concepts are learned, arranged, conveyed, communicated, utilized and perceptually transferred among people.

Due to their physical 1 or 2-dimensional structure, these prior art methods typically limit information content to a few visually immediate local displays and, by doing so, simultaneously limit ready access to broader useful spatially unifying and essential dynamic interrelated information. Typical 1 and 2-dimensional prior art tools intentionally restrict the range and scope to narrow, immediate and isolated project management information and by such restriction tend to concentrate on limited mental perceptions when more spatially related and comprehensive mental perception is preferred as a unified whole. Thus, such 1 and 2-dimensional tools and methods are generally less favored as a means of concurrently depicting and conjoining a broader range of spatially interrelated project management intelligence components for purposes of display, learning, exhibit and communication.

A critical limitation of 1 and 2-dimensional image systems is revealed in recent brain science discoveries related to human perception and consciousness by Dr. Christof Koch, Cognitive and Behavioral Biology and computation and neural systems, California Institute of Technology. As stimuli impinge on human sense organs, electrical signals are generated and passed along neuronal pathways building percepts (memory) in the brain's neuronal structures. Dr. Koch's work shows that 35%-40% of brain activity is given over to processing of visual images. Percepts formed from visual image stimulation are shaped by a phenomenon called image blindness. In image blindness the conscious brain part alerts on only a few selective stimuli at a time even though multiple other equally important stimuli are concurrently being processed by the unconscious brain part. The conscious brain part will alert more strongly on habituated stimuli even though other stimuli are present and maybe of greater importance to the situation. Percepts in the brain continually via for dominance with other percepts and the more reinforced percepts most always suppress less reinforced percepts. Dominant percepts are more intensely activated upon suggestive recall even though both percepts exist in memory.

Project stakeholders using prior art methods habitually build weakened perceptions of project management systems when better percept strengthening methods could be used. Stimuli from 1 and 2-dimensional spatial methods reinforce only selective and narrowed local aspects existing largely in isolation from its comprehensive and spatial interrelationship to the broad field of project management. Reinforcement with limiting, narrow and selective local stimuli builds inferior percepts that come to dominate over other percepts that are equally important and spatially interrelated to project management but are not easily alerted due to image blindness.

Percept reinforcement and learning effects in educational technology using interactive multimedia training systems in the field of instrumentation technology were measured and documented in a U.S. National Science Foundation study directed toward the Instrument Society of America's worldwide instrument training standardization and Certified Control Systems Technicians certification program (Kenneth J. Sweeney. *US National Science Foundation, Project #9454508*, 1994-1997). Elements, principals and functions of physics and physical parameter measuring instruments were presented to learners using interactive multi-dimensional sensory object media with (INVOLVE®). The system allows learners to visualize, interact and manipulate instrumentation objects within a spatially unified operating system environment. Subject matter local concepts (single or multiple measuring instruments) are arranged and displayed spatially conjoined in relation to each other and to their broader interrelated operating system environment (ie. a complete chemical process control operation). Instrumentation concepts and aspects including measured input and output data are displayed in spatially unified relation to each other and to the broader spatially interrelated field of instrumentation intelligence applications using multisensory media. Controlled and experimental learning groups were studied by limiting learning episodes to one-time-pass throughs of the subject matter. Time to achieve predetermined test scores and perceptual recall capacity was measured. Control groups used traditional 1 and 2-dimensional learning system presentations (ie, books). Experimental groups used spatially unifying multimedia system presentations.

These studies document conclusively that subject matter learners using spatially unified learning systems achieved predetermined test scores in 51% less time than learners using traditional 1 and 2-dimensional learning methods. Additionally important, learners achieving predetermined test scores in 51% less time also showed greater quantities of subject matter recall over longer post-learning intervals as opposed to learners using 1 and 2-dimensional learning methods. Clearly, users of spatially unifying learning methods learn faster and have greater recall and retention capacity over users using less spatially unified learning methods.

Further barriers of 1 and 2-dimensional learning methods may be overcome with learning methods tailored to "system dynamics" by virtue of conveying unified complexity and dynamics of a system's components. System dynamics learning aims at understanding greater degrees of a whole system's interconnected component complexity, dynamics of system components interactions, negative and positive feedback loops, event stocks and flows, and networks of component interrelationships. (John D. Sterman. *Business Dynamics Systems Thinking and Modeling for a Complex World*. MIT, 2000.)

The structure of 1 and 2-dimensional learning methods; unlike system dynamics, thwarts greater understanding of project management system complexity, dynamics, and feedback processes commonly encountered in the field of project management. 1 and 2-dimensional learning methods; in contrast to "system dynamics" learning methods, communicate and depict the discipline of project management mostly as independent collections of definitions to be known. The mere ordering of activities into sequential linear-like events (one event directly following the previous) without emphasizing endogenous interconnected dynamics throughout the systems components and activities, yields inferior learning results. Such idiosyncratic, sequential step-like event-ordered learning, with 1 and 2-dimensional methods, causes project management learners, in-turn, to form similar idiosyncratic event-oriented cognitive models of project management practice. Such cognitive models are subsequently used when actually working in project management environments.

1 and 2-D learning models do contribute in building simple cognitive models for use in cases where there are few dynamics among the system's components. However, 1 and 2-D learning models will create flawed mental models which are not effective when applied to complex project management systems. Simplified learning models create numerous impediments to effective improvement of an individual project manager's performance. Flawed cognitive maps based on simplified learning models render project management practitioners deficient in achieving greater levels of project successes.

With simpler teaching models; for example, target project managers operating with event-oriented mental models will tend to respond to project "disturbances" or "disruptions" as "one-off" events without considering delayed "ripple" or "spillover" dynamic effects upon many other endogenous project events/activities more distant in time and space. Typical reasoning, to wit: "If I encounter an immediate event/activity causing a project disturbance, I will respond to it so as to contain its immediate disruptive effect on the system." However, limited cognitive models fail to better prepare the target project manager to respond also to delayed downstream 'ripple' dynamics that the instant disruption and containment response may impart upon interconnected project system events further removed in time and distance. All too frequently, target project managers find themselves forced to respond in the future to what is widely known as "unintended or unanticipated consequences".

Substituting flawed mental models for more unifying cognitive guides to project management, leads project managers into making erroneous inferences, misperceptions of system dynamics, under- and over-shoot responses and diminished ability to acquire new mental models from lessons learned. By relying on flawed preformed mental models, perceptions of current experience are bounded by the structure of these inferior models. Target project managers often unwittingly later fall victim to their own unintended consequences created earlier in the project. They frequently resort to just "putting out fires". Lacking clarity of dynamic complexity in a system slows learning and comprehension cycles and reduces performance opportunity. Simplified learning methods and the resultant cognitive models lead to unnecessary amounts of economic failure, waste and human frustration throughout the global project management industry.

Better approaches to project management learning and practice requires: (1) better tools to elicit and represent the mental models held about difficult project management problems, (2) models and methods to challenge, improve and change existing mental models of project management, (3) designing new rules, and applying new cognitive skills to the practice of project management, and (4) methods to sharpen scientific reasoning skills and improve group processes in project management.

Accordingly, there exists need for methods and systems for teaching, learning, displaying, and communicating numerous and varied aspects of project management systems that overcomes the interrelated spatial limitations and cognitive barriers introduced by 1 and 2-dimensional prior art methods and systems. The present method and system utilizes a spatially unified system of 3-dimensional objects for simultaneously visually displaying separate, immediate and local distinct intelligence while concurrently providing comprehensive, conjoined, and interrelated project management intelligence. The present method and system affords more favored, efficient and ready access to spatially related project management intelligence for the purpose and ease of timely communicating, learning and perceiving comprehensive and interrelated project management concepts and principles.

SUMMARY OF THE INVENTION

In accordance with the present invention, an interactive project management pedagogic method and system is provided that substantially solves significant problems in the prior art of arranging and displaying project management intelligence. With the present method and system, a 3-dimensional spatially unifying system concurrently displays both discrete as well as interrelated system wide and conjoined project management concepts.

The present system utilizes a plurality of independent objects, each directed toward discrete characteristic intelligence domains related to the field of project management. The system's plural objects are distinct polytopes whose separate individual stand-alone geometries uniquely correspond to separate domains of project management intelligence. The separate and unique polytope geometries specifically reference three distinct project management intelligence domains; (1) project knowledge, (2) project process groups, and (3) project management competency.

Each geometric polytope's multiple surface sections further correspond and reference clusters of different functional areas within the respective project management intelligence domains. Each polytope surface section further displays information specifically describing project management functions and aspects. The spatially unifying system of plural polytopes, polytope geometries, polytope sections and information provide maneuverable discrete objects and information which may be maneuvered into a broad range of spatially unified, concurrent, comprehensive, conjoined and interrelated ways of providing a 3-dimensional visual display of numerous intelligence images in accord with the comprehensive field of project management.

More specifically, the present system of apparatus provides interactive means for a target project stakeholder to maneuver and order the respective polytopes, polytope sections and information so as to concurrently align domains, further align areas within domains, in accord with functions and other aspects of project management so as to display hundreds of thousands of different distinct and conjoined images of project management intelligence. The system provides for maneuvering the respective articulating polytopes, sections and information expression into preferred alignments comprising 3-D spatial images of intelligence specifically directed to project management as a unified system.

In one preferred method of use, a single polytope image may be considered in isolation and apart from all other polytope images but remain in spatial relation to the remaining whole field of project management. In another preferred method of use, a single polytope may be aligned concurrently with another polytope spatially forming a unique related conjoined polytope image pair with respect to each other but the pair image exists within a broader spatial range of project management images and relates to a spatial image of project management as a whole. In still another preferred method of use, several polytopes and area clusters, may provide for a broad spatial range of image patterns selected from a collection of hundreds of thousands of separate combinations of unique functional project management intelligence images by arranging and aligning a plurality of polytopes, plurality of polytope sections, and plurality of information forming combined intelligence spatial images having at least one information item, one polytope cluster area, and one polytope. A broad range of functional project management intelligence may also be arranged and displayed by maneuvering multiple pluralities of polytopes, multiple pluralities of polytope sections (cluster areas), and multiple pluralities of information items thereby forming multiple but distinct 3-D spatially related images.

A significant difference and advantage of the present method and system over the prior art, is that the interactive project management pedagogic system provides superior communication repeatability, reliability and uniformity. All the system's spatially conjoined image pattern results are capable of consistent reproduction with validity and its results accurately depict intelligence and codified elements in the project management field.

Another significant difference and advantage of the present method and system over the prior art, is that it provides a 3-dimensional system utilizing independent, connected and articulating polytopes to concurrently arrange and display conjointments of intelligence domains, functional cluster areas within domains, and information expressions directed toward project management intelligence as preferred by the target user (project manager, analyst, or stakeholder). This provides the target with clear conjoined and spatially interrelated intelligence perspectives and depicting concise or broad image alignments of concepts to be displayed and viewed as distinct sets of unifying image patterns of intelligence within the comprehensive project management field. Moreover, the collection of polytopes, polytope sections and information items taken as a 3-dimensional whole assists the target and the targets audience to quickly and easily form and access one to many spatial perceptual images of a preferred order of conjoined intelligence.

Another significant difference and advantage of the present method and system over the prior art, is the technical advantage of the present method and system when arranging and displaying abstract and complex project management intelligence and functional concepts in 3-D form. Project intelligence domains (knowledge, process groups, management competency), domain area clusters, information items and other important aspects may be concurrently and rapidly ordered, easily handled, visualized, perceived, maneuvered and exhibited in numerous 3-dimensional spatially conjoined image patterns as preferred by the target and an audience.

Another significant difference and advantage of the present method and system over the prior art, is that it comprises project neutrality including the ability to utilize the tool with simple and or complex projects and reduces time involved in the art of learning and uniformly communicating with team members and conveying interrelated and conjoined project management intelligence in a unified manner.

A further significant difference and advantage of the present method and system over the prior art, is that the 3-dimensional union of polytopes leads to multiple separate spatially conjoined images but where all images remain concurrently in spatial perspective to the comprehensive field of project management. Such explicit advantages in the spatially unifying system provides for both locally selective and comprehensive communication for continuity and consistency of perspectives on such project management intelligence as; triple constraint goals, superior customer relations, reduced schedule time, less project costs, greater product and project management quality, predictability of project team performance, higher profit margins, enhanced productivity, efficient work coordination, elevated staff morale, and thousands of other aspects.

A still further significant difference and advantage of the present method and system over the prior art, is that it utilizes significantly more efficient human perception techniques and gains to learning efficiency, recall and retention by using spatially unifying image systems. The present invention will allow project stakeholders to more readily form more comprehensive and unified spatially interrelated percepts and overcome image blindness from habitually using limited locally selective and less unifying spatial images. Project stakeholders using the 3-dimensional system will be able to build mental percepts and models with visual stimuli from a more spatially unifying system thereby alerting the brain with stimuli that is conjoined in spatial relation to its comprehensive whole. The present method and system has the advantage of reducing image blindness which reinforces isolated and local selective criteria. The present method and system reinforces and builds percepts and cognitive models that simultaneously spatially and conjointly display both selective local concepts together with their interrelationship to the overall broader field of project management. Project stakeholders using the spatially unified preferred art will learn project management intelligence faster and retain such intelligence longer than using 1 and 2-dimensional systems. These advantages are fundamental to increased productivity of project managers and other project stakeholders.

DESCRIPTION OF THE PREFERRED EMBODIMENT

Figure 1:
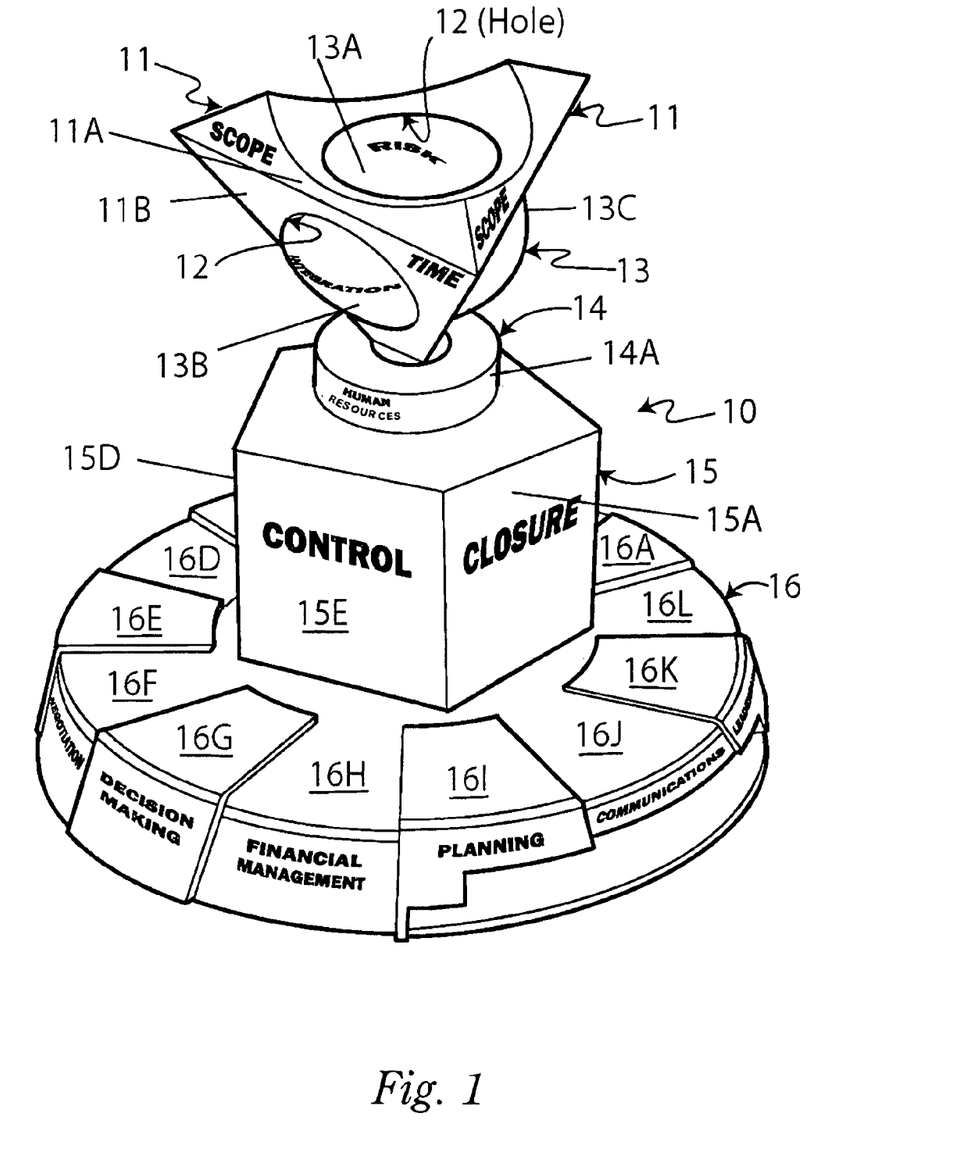
FIG. 1 is a perspective view of a 3-dimensional pedagogic apparatus for use in the present system for visually displaying various aspects of conjoined and interrelated project management intelligence, as seen from the top and one side.
Figure 2:
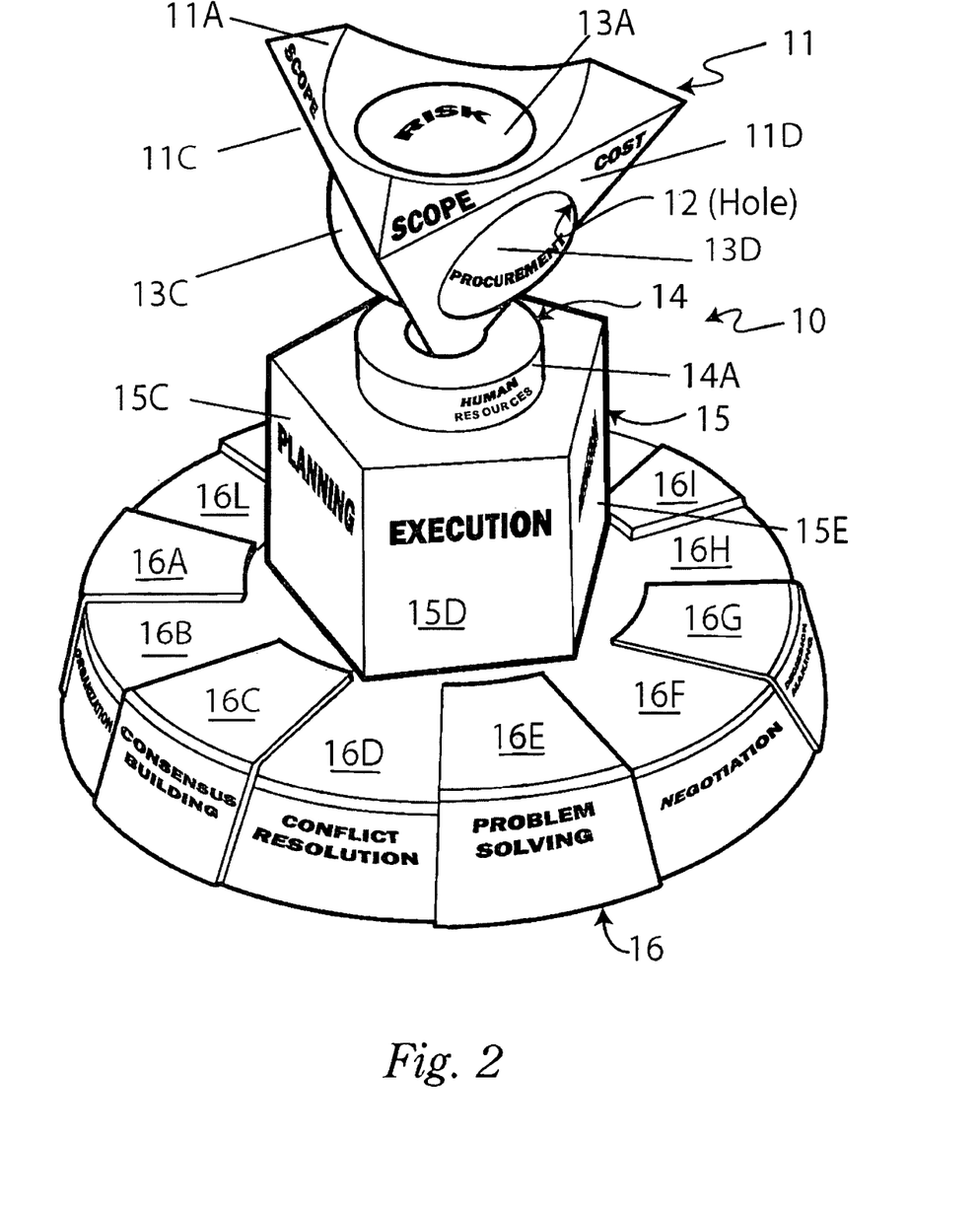
FIG. 2 is a perspective view of the 3-dimensional pedagogic apparatus of FIG. 1 as seen from the top and side opposite that shown in FIG. 1.

Referring now to FIGS. 1 and 2, the 3-dimensional pedagogic apparatus 10 includes a plurality of independently manually manipulatable polytopes that can positioned relative to one another, each directed toward discrete characteristic intelligence domains related to the field of project management. The uppermost polytope 11 corresponds to the domain of project management knowledge, the intermediate polytope 15 corresponds to the domain of project management process groups, and the lowermost polytope 16 corresponds to the domain of project management competency. The articulating polytopes may be formed of wood, glass, plastic, metal, or other suitable materials. The polytopes may also incorporate powered electronic components combined into a unified system that can be easily handled, aligned and ordered by the target project manager or analyst for visual electronic video and audio communications and displays.

The uppermost polytope 11 is an inverted generally pyramidal configuration having a triangular top surface 11A with upward angled pitched corners, and three triangular planar side surfaces 11B, 11C, and 11D, each bearing indicia directed toward a respective project management core knowledge area, for example; "scope", "time", "cost", and "quality". A hole 12 is formed in each of the planar surfaces of the triangular polytope 11. A spherical polytope 13 is rotatably mounted in the pyramidal polytope 11, and segments of its outer circumference protrude through the holes 12 to define four convex spherical surfaces 13A, 13B, 13C, and 13D, each bearing indicia directed toward a respective project management facilitating knowledge area, for example; "risk", "procurement", "communications", and "integration".

The lower ends of the sides of the uppermost polytope 11 converge downwardly and inwardly and are secured to a generally cylindrical collar 14 having a peripheral side wall surface 14A bearing indicia directed toward the project management facilitating knowledge area, for example; "human resources".

The cylindrical collar 14 is rotatably mounted at the center of the intermediate polytope 15, which is a generally pentagonal configuration having five rectangular side surfaces 15A, 15B, 15C, 15D, and 15E, each bearing indicia directed toward a respective project management process group area, for example; "initiation", "planning", "execution", "control", and "closure".

The intermediate polytope 15 is rotatably mounted at the center of the lowermost polytope 16, which is a generally cylindrical disk-like configuration having an upward facing top surface and somewhat angled outward facing side surface divided into twelve sections with alternating elevations (16A-16L, each bearing indicia directed toward a respective project management skill set area, for example; "communications", "leadership", "planning", "team development", "time management", "negotiation", "consensus building", "financial management", "problem solving", "decision making", "conflict resolution", and "organization".

Those skilled in the art will recognize that the indicia borne on the polytopes are in accordance with known project management elements specific to project management domains, cluster areas of domains, processes, and related functional informational items and aspects of project management. In other words, twenty-six (26) discrete polytope sections are arranged in four (4) core knowledge areas, five (5) facilitating knowledge areas, five (5) process group areas, and twelve (12) management skill set areas directed toward interrelated project management intelligence.

The plurality of articulating polytopes shown in FIGS. 1 and 2 form a spatially unifying pedagogic system of articulating polytopes that can be manually manipulated and maneuvered and aligned relative to one another so as to display realistic, pragmatic, objective and highly useful, interrelated, and conjoined arrangements directed toward the field of project management intelligence. Numerous differently aligned exhibits may be formed to display hundreds of thousands of spatially arranged views of project management intelligence. Thus, the present invention provides a means of quickly shaping, forming, and displaying enumerable spatially interrelated sets of distinct images for exhibiting conjointments of project process groups, knowledge, and management skill sets specific to a preferred stage of project management intelligence. Those skilled in the art will further understand that the 3-dimensional spatially unified pedagogic system provides conjoined exhibits of project management intelligence and superior means of concurrently communicating a broad range of spatial perspectives. The interactive and spatially unifying pedagogic tool of the present invention provides a means of forming uniquely related project management functional image patterns from a collection of hundreds of thousands of concurrent different combinations.

Example 1

Figure 3:
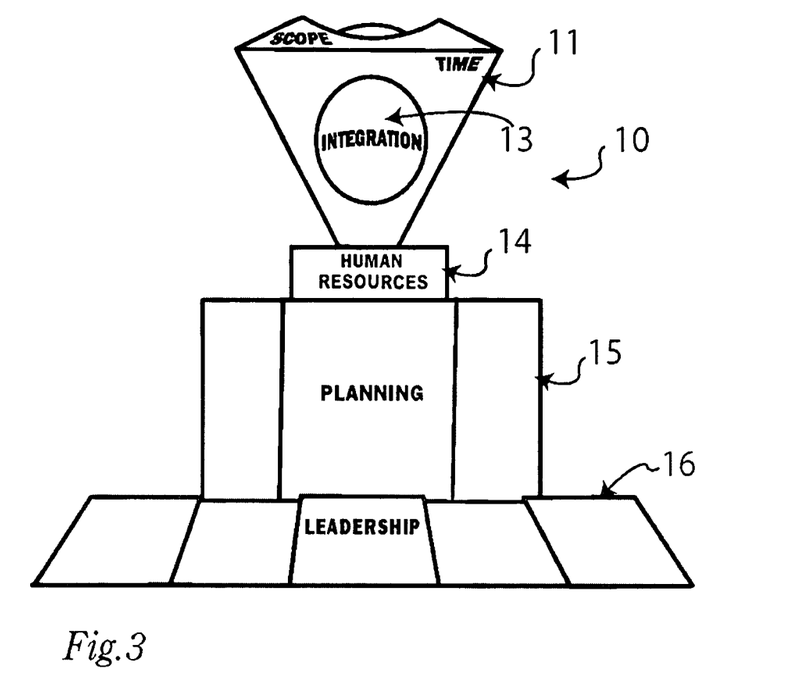
FIG. 3, is a side elevation view illustrating, somewhat schematically, an example wherein the polytopes, polytope sections, cylindrical collar and specific domain information items borne thereon representing the domains of project knowledge, processes and management competency are spatially aligned to display: SCOPE-TIME, INTEGRATION, HUMAN RESOURCES, PLANNING, and LEADERSHIP.

In one example, as shown schematically in FIG. 3, the uppermost polytope 11, the spherical polytope 13, the collar 14, the intermediate polytope 15, and the lowermost polytope 16, each bearing at least one information item per polytope; may be arranged to display: SCOPE-TIME, INTEGRATION, HUMAN RESOURCES, PLANNING, and LEADERSHIP. In this example spatially aligned exhibit; scope-time core knowledge, integration facilitating knowledge, human resources facilitating knowledge and the planning process group are aligned with the leadership management skill. The FIG. 3, spatially aligned project management exhibit displays an ordered project intelligence image and the ordered display's perspective may be spatially maintained in relation to, and concurrent with, all other aspects of project management (and remain so until the target desires an alternate exhibit of another preferred example exhibit showing a different spatially conjoined and interrelated display of a separate aligned image representing still another spatially preferred image pattern of project management intelligence, and so on.

Example 2

Figure 4:
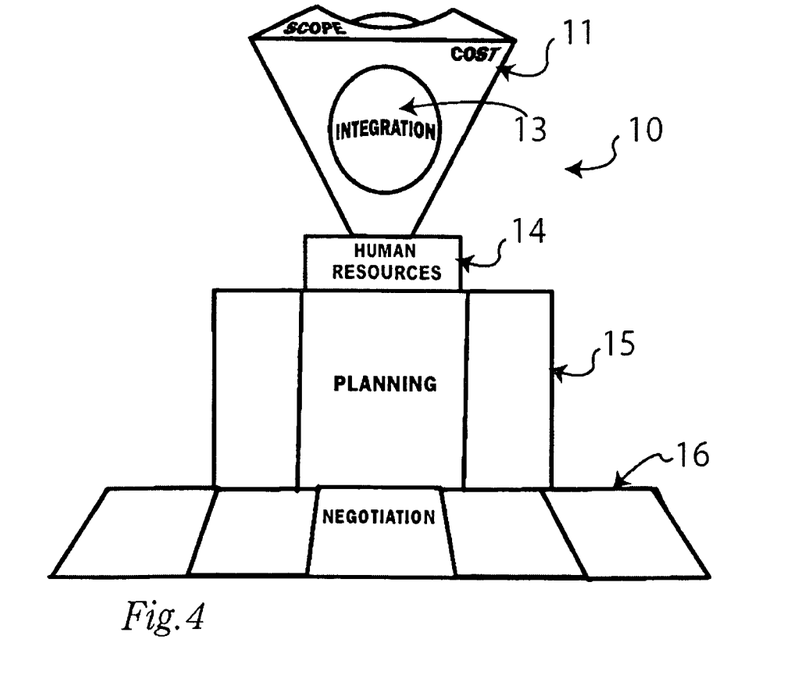
FIG. 4, is a side elevation view illustrating, somewhat schematically, an example wherein the polytopes, polytope sections, cylindrical collar and specific domain information items borne thereon representing the domains of project knowledge, processes and management competency are spatially aligned to display: SCOPE-COST, INTEGRATION, HUMAN RESOURCES, PLANNING, and NEGOTIATION.

In a second separate example, as shown schematically in FIG. 4, the uppermost polytope 11, the spherical polytope 13, the collar 14, the intermediate polytope 15, and the lowermost polytope 16, each bearing at least one information item per polytope; may be arranged to display: SCOPE-COST, INTEGRATION, HUMAN RESOURCES, PLANNING, and NEGOTIATION.

Still other spatially arranged and aligned exhibits of project management image patterns may be formed from hundreds of thousands of separate distinct combinations of uniquely related project management functions by arranging the plurality of polytopes, plurality of polytope sections, and plurality of information items forming combined alignment exhibits having at least one information item, one polytope section and one polytope, all of which are directed toward characteristics related to a specific conjoined display of one interrelated perspective of the field of project management intelligence. Those skilled in the art will understand that the spatially unifying pedagogic tool may be arranged by separate yet specific domains of knowledge, process group, and management competency and adapted further by aligning specific domain sections with other specific domain sections.

Example 3

The plurality of polytopes, and plurality of polytope sections, may also be arranged with respect to adjacent multiple pluralities of information items thereby forming multiple but distinct combinatorial aligned image patterns exhibiting multiple elements within a domain depicted within the display. For example, as shown schematically in FIG. 5, the uppermost polytope 11, the spherical polytope segments 13, the collar 14, the intermediate polytope 15, and the lowermost polytope 16, may be arranged to display: SCOPE-TIME, SCOPE-COST, INTEGRATION—PROCUREMENT-HUMAN RESOURCES and INITIATION-PLANNING-EXECUTION and PLANNING-COMMUNICATIONS-LEADERSHIP-TIME MANAGEMENT-TEAM DEVELOPMENT.

The number of spatially aligned images in the broad sample space of all possible spatial images considered without regard to unique ordering is so great that efficient methods are needed to count the total number of discrete alignment images. In order to determine the possible number of distinct alignment images using the pedagogic apparatus, it is helpful to use mathematical principles of combinatorial counting. Thus, the concurrent number of combinations, when order of unique counted alignments is not considered important, that can be made of a group of n related objects taken x at a time is given by:

$$\binom{n}{x} \Longrightarrow \frac{n!}{x!(n-x)!}$$

where n!=(n) (n–1) . . . (2) (1). The symbol n! is read "n factorial." Combinatorial mathematical statistics is discussed further in (Hamburg, M. *Statistical Analysis for Decision Making*, $2^{nd}$ *Edition*, 1977. ISBN-0-15-583747-8).

Applying combinatorial mathematical statistics to arrangements of aligned plural polytopes and informational items as similarly depicted in FIGS. 3 and 4, described in Examples 1 and 2, demonstrates 53,130 different combinations of image displays using alignments of this type.

Figure 5:
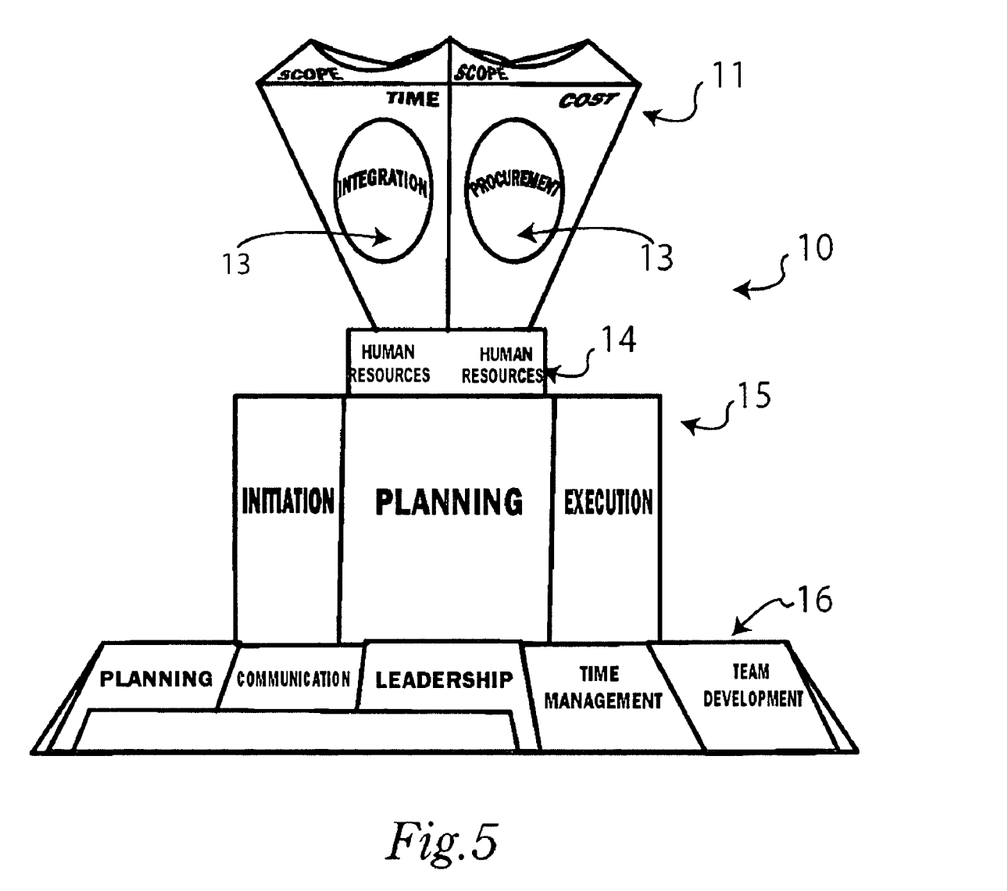
FIG. 5, is a is a side elevation view illustrating, somewhat schematically, an example wherein the polytopes, multiple polytope sections, cylindrical collar and multiple domain information items borne thereon representing the domains of project knowledge, processes and management competency are spatially aligned to display: SCOPE-TIME, SCOPE-COST, INTEGRATION-PROCUREMENT, HUMAN RESOURCES and INITIATION-PLANNING-EXECUTION and PLANNING-COMMUNICATIONS-LEADERSHIP-TIME MANAGEMENT-TEAM DEVELOPMENT-ORGANIZATION.

Applying combinatorial mathematical statistics to arrangements of aligned plural polytopes and informational items as similarly depicted in FIG. 5, described in Example 3, demonstrates 5,200,300 different combinations of image displays using alignments of this type.

The pedagogic system is also able to accommodate specific order of aligned images. Should order be considered important in the arrangement of unique alignments, the mathematical permutation formulas are utilized to derive the possible number of counts. When forming permutation arrangements of a plurality of polytopes to form aligned image patterns, the number of permutation counts of images exceeds the possible number of combinatorial counts and is extraordinarily larger by orders of magnitude. Permutation formulas may be referenced in Hamburg, *Op. Cit.*, and are not discussed further herein.

A principal advantage of the present invention over prior art systems arises in conjunction with its embodied 3-dimensional polytopes and polytope elements that are common with, and directly associated with analytical techniques for purposeful design and control of complex project system dynamics. The field of project management intelligence domains and domain components, functions and elements are shared and directly linked to various means of dynamic systems analysis techniques to more effectively design, monitor and control the management of project systems. The present invention motivates better methods and steps to identify, better form mental models, and focus perception on combinatorial images of project management systems. Any combinatorial image of project elements formed with the present invention further motivates uses in direct conjunction with dynamic systems analysis techniques. One form of dynamic systems analysis method is matrices used to isolate, integrate, and analyze interrelationship effects among system elements of the present invention. A matrix of size (n×m), n=rows and m=columns, of project elements is used to analyze cause and effect interactions of project elements and make design and control inferences about a project throughout its lifecycle.

The target project manager or stakeholder uses the present invention to rapidly and easily identify relevant combinatorial project elements then transfers the identified project elements into a constructed matrix of size (n×m). A matrix of size (n×m) consisting of relevant project elements is grouped by classes of domains, components, functions and elements in direct relationship to the present invention polytope groupings. Matrix analysis is then performed on the matrix elements as understood by those accomplished in the science of system dynamics. Matrix analysis isolates and measures different quantities, types and degrees of linked cause and effects, loop circuits, and feedback networks among the various elements in the matrix.

An example of a 4×4 matrix, {n=4 and m=4} is shown in the table below:

|   | A | B | C | D |
|---|---|---|---|---|
| A |   | • |   | • |
| B | • |   | • |   |
| C | • | • |   | • |
| D |   |   | • |   |

In this example, the matrix contains elements A, B, C, and D listed to the left of the respective rows and at the top of the respective columns. Cause and effect interrelationships among the elements indicated by bullets appearing in the matrix cells are described as follows.

Firstly, reading from left to right across respective rows: Entering the matrix from the left hand side, a system effect is noted; A affects B and D, B affects A and C, C affects A and B and D, and D affects C.

Secondly, reading from top to bottom down a respective sample column:
Initially, as firstly described, element A effects B (a row relationship previously described by entering the matrix at row A), secondly, element B in-turn effects A. The B effect on A is found by entering the B column and then moving to the B x B cell (a matrix diagonal or pivot space) and then re-entering the matrix B row from the left hand side and noting the next effect which is B effecting A.

This dynamic interrelationship with A firstly effecting B, followed secondly with B effecting A is commonly known as a reinforcing feedback loop. This type of endogenous system loop among the system elements is a dynamic reinforcing cause and effect interrelationship loop. The dynamic of A and B, is understood by those accomplished in the science of system dynamics as a reinforcing or amplifying cause and effect feedback loop among the identified elements in the matrix. Other lengthy and complex dynamic reinforcing, amplifying, deviating, counteracting, and other cause and effect feedback loops exist in the 4×4 matrix example, but are not detailed here. Further elaboration is found in the publication: John D. Sterman. *Business Dynamics Systems Thinking and Modeling for a Complex World*. MIT, 2000.

The power of matrix techniques can be improved upon by extending matrix analysis cause and effects features that includes; describing elements as positive or negative, assigning magnitudes, weights or probabilities to elements, identifying feedforward and feedback loops, linkages, and networks and tracing deviation amplifying and deviation counteracting loop effects in and among the project matrix system of elements. A target project manager or stakeholder can use the common elements of the present invention in direct conjunction with matrix analysis techniques to improve the target's project management effectiveness and control of project systems dynamics.

An additional key advantage of the present invention over prior art systems arises in conjunction with its embodied polytopes and polytope elements that are also common with, and directly related to, dynamic systems analysis techniques of stocks and flows for systems mapping and analysis. Stocks and flows characterize the state of a complex project system and provide a basis for action on the system, as discussed further at John D. Sterman, *Op. Cit.*

System "stocks" represent the status of the project system and "flows" represent both inputs (inflows) of project elements into the project system and outputs (outflows) from the project system. In mathematics, system dynamics, control theory, and related engineering fields, "stocks" are also known as "integrals, sums or state variables". "Flows" are also known as "rates or derivatives".

Chemists speak of "reactants" and "reaction products" (the stocks) and "reaction rates" (the flows). Manufacturing stocks and flows are also called "buffers and throughput". Accounting stocks and flows are balance sheets and income statements. Economic stocks, eq., capital stocks are levels (of wealth) and flows, e.q., (GDP) are rates of national outputs. Medicine stocks are prevalence (reservoirs) of disease and flows are incidence and rates of infection, morbidity and mortality.

In Sterman, Ibid., stocks can be tangibles or intangibles and the contents of stocks can only change through inflows and outflows. Stocks and flows are represented mathematically as follows:

$$\text{Stocks}(t) = \sum_{t=0}^{t} [\text{Inflow}(s) - \text{Outflow}(s)] + \text{Stocks}(t_0)$$

Likewise:

$$\text{Net change in Stocks}_{(t)} = \text{Inflows}_{(t)} - \text{Outflows}_{(t)}$$

In discrete project phases, events within phases are represented as numerous stocks of accumulations of tasks or activities in different categories to be performed; such as, "work-to-be-done", "work-really-done", "undiscovered rework", and "known rework", etc. Tasks done correctly add to the stock of "work-really-done" while tasks known to contain errors or known to be done incorrectly add to the stock of "known-rework". Tasks done incorrectly, but not yet discovered through quality audits or testing, add to the stock of "undiscovered-rework". Once discovered, "undiscovered-rework" stocks then flow to "known-rework" to be completed and accumulated in stocks of "work-really-done". Such stock and flow analysis is iterated throughout all lifecycle phases until the project is actually closed out in the closure phase.

In other examples, intangible stocks can characterize mental states as accumulations of memories, perceptions and beliefs. Mental stocks are buildups/accumulations of past attitudes and behavior events (inflows to mental states), which persist until acted on by new inflows and changes in outward behaviors (outflows from mental states).

The present method and apparatus in conjunction with system dynamics techniques is designed to improve not only the perceptual and mental models of target project managers but improve their actual project performance.

A target project manager or stakeholder uses the present invention to rapidly and visually identify relevant combinatorial images of project elements. Those accomplished in the art of project management will fully recognize that, in one embodiment of the present invention, these combinatorial elements reflect stocks and flows of project knowledge, management skills, project tools and techniques and other project elements that when activated upon resources yield accumulations or buildups of a current project status. Identified project elements are then transferred to the stocks and flows mapping system to further characterize a current status of the project (the stock or accumulation of past element inflows and outflows).

Project inflows and outflows entered into the stocks and flows system are then analyzed with stock and flows analysis tools as understood by those familiar with the art of stocks and flows system dynamics. The cycle of project inflows and outflows and stock accumulation analysis steps continues with iterations of new inflows and outflows throughout project lifecycles until overall project inflows and outflows are finalized and the project is completed.

The present invention is designed to significantly improve teaching, understanding and visualization of project interconnected system dynamics and used as a device for coupling such understandings to greater utilization of system dynamics analysis tools. The present invention when used alone or in combination with systems dynamics methods will lead to better project performance management and control and achieve greater understanding of the nature of both static and dynamic project element interrelationships.

Although the preferred embodiment has been shown and described, for purposes of example, as a tool formed of polytopes and polytope sections bearing indicia, it should be understood that the interactive and spatially unifying pedagogic tool may be embodied in any suitable medium of expression. For example, as previously discussed, the coupled independent and coordinated polytopes, polytope sections and section information items, may be embodied in electronically powered visual displays. Such embodiments include; audio enunciators and speech narration combined with computer data look-up libraries, registers, file methods, computer monitors (CRTs, LCDs, flat panel or plasma screens), whether in analog or digital form, visually, chromophorically relating relevant project management intelligence or data in relation to image alignments and actual projects.

Those skilled in the art will further understand that the coupled independent and coordinated polytopes, polytope sections, and section information items may embody unifying spatially related image displays and audio narration for elaborating any specific preferred image display. Electronic visual display may be a television projection, other type of cathode ray tube (CRT), liquid crystal display (LCD), plasma display, flat panel displays, and speech enunciators and or the like. In such a case, the electronic images and audio narration accompanying a specific display may be ordered, depicted and narrated by activating remote or direct electronic circuits affixed to the polytopes, polytope surfaces, and or polytope sections all in relation to each other.

The polytope geometry, polytope sections, and section information items corresponding to the plurality of articulating polytope objects shown in FIGS. 1 and 2 may be keyed into an electronic computer system comprising a central processing unit (CPU) that operates the computer system in conjunction with an operating system to track, retrieve, process, store, download, upload, visually display, enunciate, and otherwise relate relevant project management data. Such a computer system also comprises computer programs (firmware) for controlling the internal functions of the computer system and running application software, an installed operating system (on hard drive, flash memory, floppy disk, CD, or ROM chip), and initializing functions for loading the computer system and operating system into system memory. A basic input/output system driver is stored in system memory to supply device-level control and support services for primary input/output devices, and performing services requests from application programs and operating systems. An input/output device for downloading, printing, and/or offloading display images and related data to other computer devices may be provided. The incorporated basic hardware and functions and operations of such computer systems and input/output drivers and devices are well known in the art and therefore not shown or described in detail herein.

While this invention has been described fully and completely with special emphasis upon preferred embodiments, it should be understood that within the scope of the appended claims the invention may be practiced otherwise than as specifically described herein. From the foregoing description of the present invention, other alternative constructions may suggest themselves to those skilled in the art. Therefore, the skill for the present invention is to be limited only by the claims and the equivalents thereof.

The invention claimed is:

1. An interactive project management teaching system for arranging, displaying, conveying, and communicating interrelated aspects of project management intelligence, comprising:
    a first 3-dimensional geometric polytope representing a domain of project knowledge having a number of surfaces or sections each bearing indicia defining respective core knowledge areas, and a number of surfaces or sections each bearing indicia defining respective facilitating knowledge areas;
    a second 3-dimensional geometric polytope representing a domain of project process groups having a number of surfaces or sections each bearing indicia defining respective process group areas;
    a third 3-dimensional geometric polytope representing a domain of project management competency having a number of surfaces or sections each bearing indicia defining respective management skill set areas;
    said first, second, and third polytopes disposed relative to one another and movably connected together so as to be movable relative to one another and each individually manipulated by a user to align selected said surfaces or sections of each said polytope relative to one another such that the relationship of said indicia on said aligned surfaces or sections functions to form and collectively visually display combinations of interrelated and conjoined functional information and aspects of project management intelligence within the respective said domains of project knowledge, project process groups, and project management competency; and
    further manipulation of either of said first, second, and third polytopes to align selected said surfaces or sections of respective said polytope relative to one another changes the relationship of said indicia on said aligned surfaces or sections to form and collectively visually display different combinations of interrelated and conjoined functional information and aspects of project management intelligence within said domains.

2. The interactive project management teaching system according to claim 1, wherein
    said first polytope representing the domain of project knowledge has four surfaces or sections bearing indicia defining four core knowledge areas, and five surfaces or sections bearing indicia defining five facilitating knowledge areas;
    said second polytope representing the domain of project process groups has five surfaces or sections bearing indicia defining five process group areas; and
    said third polytope representing the domain of project management competency has twelve surfaces or sections bearing indicia defining twelve management skill set areas.

3. The interactive project management teaching system according to claim 2, wherein
    said four core knowledge areas defined by said indicia on said four surfaces or sections of said first polytope are scope, time, cost, and quality, and said five facilitating knowledge areas defined by said indicia on said five surfaces or sections of said first polytope are risk, procurement, communications, integration, and human resources.

4. The interactive project management teaching system according to claim 2, wherein
    said five process group areas defined by said indicia on said five surfaces or sections of said second polytope are initiation, planning, execution, control, and closure.

5. The interactive project management teaching system according to claim 2, wherein
    said twelve management skill set areas defined by said indicia on said twelve surfaces or sections of said third polytope are communications, leadership, planning, team development, time management, negotiation, consensus building, financial management, problem solving, decision making, conflict resolution, and organization.

6. An interactive teaching method for arranging, displaying, conveying, and communicating interrelated aspects of project management intelligence, comprising the steps of:
    providing a device formed of a plurality of 3-dimensional geometric polytopes disposed adjacent to one another and movably connected together to be movable relative to one another, said polytopes comprising a first polytope representing a domain of project knowledge having a number of surfaces or sections each bearing indicia defining respective core knowledge areas, and a number of surfaces or sections each bearing indicia defining respective facilitating knowledge areas, a second polytope representing a domain of project process groups having a number of surfaces or sections each bearing indicia defining respective process group areas, and a third polytope representing a domain of project management having a number of surfaces or sections each bearing indicia defining respective management skill set areas;
    manipulating said first, second, and third polytopes individually to align selected said surfaces or sections of each said polytope relative to one another such that the relationship of said indicia on said aligned surfaces or sections functions to form and to collectively visually display combinations of interrelated and conjoined functional information and aspects of project management intelligence within the respective said domains of project knowledge, project process groups, and project management competency; and
    further manipulating either of said first, second, and third polytopes to align selected said surfaces or sections of respective said polytope relative to one another to change the relationship of said indicia on said aligned surfaces or sections to form and collectively visually display different combinations of interrelated and conjoined functional information and aspects of project management intelligence within said domains.

7. The method according to claim 6, wherein
    said first polytope representing the domain of project knowledge has four surfaces or sections bearing indicia defining four core knowledge areas, and five surfaces or sections bearing indicia defining five facilitating knowledge areas;

said second polytope representing the domain of project process groups has five surfaces or sections bearing indicia defining five process group areas;

said third polytope representing the domain of project management competency has twelve surfaces or sections bearing indicia defining twelve management skill set areas; and said steps of manipulating and further manipulating said polytopes comprises aligning selected said surfaces or sections bearing indicia defining said core knowledge areas, said surfaces or sections bearing indicia defining facilitating knowledge areas, said surfaces or sections bearing indicia defining process group areas, and said surfaces or sections bearing indicia defining management skill set areas, relative to one another so as to collectively visually display combinations of interrelated and conjoined functional information and aspects of project management intelligence within the respective said domains.

8. An interactive teaching device for arranging, displaying, conveying, and communicating interrelated aspects of project management intelligence, comprising:

a device formed of a plurality of 3-dimensional geometric polytopes disposed adjacent to one another and movably connected together to be movable relative to one another, said polytopes comprising a first polytope representing a domain of project knowledge having a number of surfaces or sections each bearing indicia defining respective core knowledge areas, and a number of surfaces or sections each bearing indicia defining respective facilitating knowledge areas, a second polytope representing a domain of project process groups having a number of surfaces or sections each bearing indicia defining respective process group areas, and a third polytope representing a domain of project management having a number of surfaces or sections each bearing indicia defining respective management skill set areas;

said first, second, and third polytopes disposed relative to one another and movably connected together so as to be movable relative to one another and each individually manipulated by a user to align selected said surfaces or sections of each said polytope relative to one another such that the relationship of said indicia on said aligned surfaces or sections functions to form and collectively visually display combinations of interrelated and conjoined functional information and aspects of project management intelligence within the respective said domains of project knowledge, project process groups, and project management competency; and further manipulation of either of said first, second, and third polytopes to align selected said surfaces or sections of respective said polytope relative to one another changes the relationship of said indicia on said aligned surfaces or sections to form and collectively visually display different combinations of interrelated and conjoined functional information and aspects of project management intelligence within said domains.

9. The device according to claim 8, wherein said first polytope representing the domain of project knowledge has four surfaces or sections bearing indicia defining four core knowledge areas, and five surfaces or sections bearing indicia defining five facilitating knowledge areas;

said second polytope representing the domain of project process groups has five surfaces or sections bearing indicia defining five process group areas; and said third polytope representing the domain of project management competency has twelve surfaces or sections bearing indicia defining twelve management skill set areas.

10. The device according to claim 9, wherein said first polytope representing the domain of project knowledge is an inverted generally pyramidal polytope having a triangular top surface and three triangular planar side surfaces, each said surface bearing indicia defining a respective said project management core knowledge area, and each said surface having a hole therethrough;

a spherical polytope rotatably mounted in said triangular polytope with segments of its outer circumference protruding through a respective said hole to define four convex spherical surfaces on said surfaces of said triangular polytope, each said segment bearing indicia defining a respective project management facilitating knowledge area; and lower ends of said triangular side surfaces converging downwardly and inwardly and secured to a generally cylindrical collar having a surface bearing indicia defining a respective said project management facilitating knowledge area.

11. The device according to claim 9, wherein said second polytope representing the domain of project process groups is a generally pentagonal polytope having five rectangular side surfaces, each said side surface bearing indicia defining a respective said project management process group area.

12. The device according to claim 9, wherein said third polytope representing the domain of project management competency is a generally cylindrical disklike polytope having a top surface and side wall surface divided into twelve sections each said side wall surface bearing indicia defining a respective said project management skill set area.

* * * * *